United States Patent
Gatti et al.

(10) Patent No.: US 10,814,246 B2
(45) Date of Patent: Oct. 27, 2020

(54) PROCESS FOR THE PURIFICATION OF THE SOLVENT DERIVING FROM THE PRODUCTION OF ELASTOMERIC BLENDS

(71) Applicants: VERSALIS S.P.A., San Donato Milanese (MI) (IT); EVE RUBBER INSTITUTE CO., LTD., Qingdao (CN)

(72) Inventors: Gabriele Gatti, San Donato Milanese (IT); Jiye Wang, Qingdao (CN); Claudio Cavallo, San Donato Milanese (IT); Jianjun Song, Qingdao (CN)

(73) Assignees: VERSALIS S.P.A., San Donato Milanese (MI) (IT); EVE RUBBER INSTITUTE CO., LTD., Qingdao (CN)

( * ) Notice: Subject to any disclaimer, the term of this patent is extended or adjusted under 35 U.S.C. 154(b) by 0 days.

(21) Appl. No.: 16/323,694

(22) PCT Filed: Aug. 11, 2016

(86) PCT No.: PCT/IT2016/000195
§ 371 (c)(1),
(2) Date: Feb. 6, 2019

(87) PCT Pub. No.: WO2018/029716
PCT Pub. Date: Feb. 15, 2018

(65) Prior Publication Data
US 2019/0201807 A1   Jul. 4, 2019

(51) Int. Cl.
*B01D 3/14*   (2006.01)
*B01D 3/36*   (2006.01)
(Continued)

(52) U.S. Cl.
CPC .............. *B01D 3/143* (2013.01); *B01D 3/007* (2013.01); *B01D 3/36* (2013.01); *B01D 11/04* (2013.01);
(Continued)

(58) Field of Classification Search
CPC ........ B01D 3/143; B01D 11/04; B01D 15/10; B01D 3/007; B01D 11/0488; B01D 3/36;
(Continued)

(56) References Cited

U.S. PATENT DOCUMENTS 2,765,356 A * 10/1956 Skinner .................... C07C 7/10
585/856
3,037,062 A * 5/1962 Gerhold .................... C07C 7/10
208/319
(Continued)

FOREIGN PATENT DOCUMENTS

EP   0 085 372 A1   8/1983
GB   1 283 435       7/1972
(Continued)

OTHER PUBLICATIONS

International Search Report dated Feb. 27, 2017 in PCT/IT2016/000195 filed on Aug. 11, 2016.
(Continued)

*Primary Examiner* — Joseph W Drodge
(74) *Attorney, Agent, or Firm* — Oblon, McClelland, Maier & Neustadt, L.L.P.

(57) ABSTRACT

Process for the purification of the solvent deriving from the production of an elastomeric blend comprising the following steps: (a) optionally, subjecting said solvent to a pre-washing (2) in the presence of at least one acid or basic aqueous solution; (b) feeding said solvent to a liquid-liquid separation column (7); (c) feeding the stream leaving the head of said liquid-liquid separation column (7) to an azeotropic
(Continued)

distillation column (21); (d) feeding the stream withdrawn laterally (side-withdrawal) from said azeotropic distillation column (21) to an adsorption section (34a/b); Said process allows to obtain a polymer grade solvent having a quality suitable for being used indifferently and contemporaneously in various types of production plants of elastomeric (co) polymers, i.e. in plants wherein an anionic (co)polymerization is carried out, and also in plants wherein a Ziegler-Natta (co)polymerization is carried out.

17 Claims, 1 Drawing Sheet

(51) Int. Cl.
  *B01D 11/04* (2006.01)
  *B01D 15/00* (2006.01)
  *C08J 11/02* (2006.01)
  *B01D 3/00* (2006.01)
  *B01D 15/10* (2006.01)

(52) U.S. Cl.
  CPC .......... *B01D 11/0488* (2013.01); *B01D 15/10* (2013.01); *C08J 11/02* (2013.01); *B01D 15/00* (2013.01)

(58) Field of Classification Search
  CPC .......... B01D 15/00; B01D 3/00; B01D 3/008; B01D 3/40; B01D 11/02; B01D 11/0426; B01D 11/0492; B01D 15/14; C08J 11/02; B01J 39/00; B01J 39/02; B01J 39/04; B01J 41/00; B01J 41/02; B01J 41/04; B01J 47/00; B01J 47/02; C08C 2/00; C08C 2/02; C08C 2/04; C08C 2/06
  USPC .... 210/634, 639, 774, 799, 806; 203/10, 12, 203/14, 39, 41, 43; 585/802, 807, 833, 585/836, 837, 901
  See application file for complete search history.

(56) References Cited

U.S. PATENT DOCUMENTS

| | | | | |
|---|---|---|---|---|
| 3,350,419 | A * | 10/1967 | Null | C07D 301/32 549/532 |
| 3,378,465 | A * | 4/1968 | Schleppinghoff | B01D 3/36 203/25 |
| 3,562,227 | A * | 2/1971 | Drusco et al. | C08C 2/06 528/482 |
| 3,707,575 | A * | 12/1972 | Muller et al. | B01D 11/0488 585/803 |
| 5,446,231 | A * | 8/1995 | Arganbright | C07C 7/10 585/802 |
| 5,877,385 | A * | 3/1999 | Lee | B01D 3/322 585/435 |
| 6,444,096 | B1 * | 9/2002 | Barnicki | C07C 45/80 203/43 |
| 6,843,890 | B1 | 1/2005 | Godbole | |
| 2014/0114111 | A1 * | 4/2014 | Dorato | C07C 7/11 585/867 |
| 2014/0155543 | A1 * | 6/2014 | Soddu | C08C 19/44 524/572 |
| 2014/0162345 | A1 * | 6/2014 | Eyal | C11D 3/38609 435/253.6 |

FOREIGN PATENT DOCUMENTS

| | | |
|---|---|---|
| GB | 2 068 390 A | 8/1981 |
| RU | 2 176 648 C2 | 12/2001 |

OTHER PUBLICATIONS

Douglas, J. M. "Conceptual Design of Chemical Processes", McGraw-Hill Book Company, Jan. 1, 1988, pp. 163, 180, 182-184, XP055301827.

Office Action dated Jan. 22, 2020 in corresponding Russian Patent Application No. 2019105069/05(009693) (with English Translation), 16 pages.

Kirpichnikov P. A. et al., "Albom Tekhnologicheskikh Skhem Osnovnykh Proizvodstv Promyshlennosti Sinteticheskogo Kauchuka", Leningrad, Khimiya, figs.72-73, 1986, pp. 161-163 and cover pages.

* cited by examiner

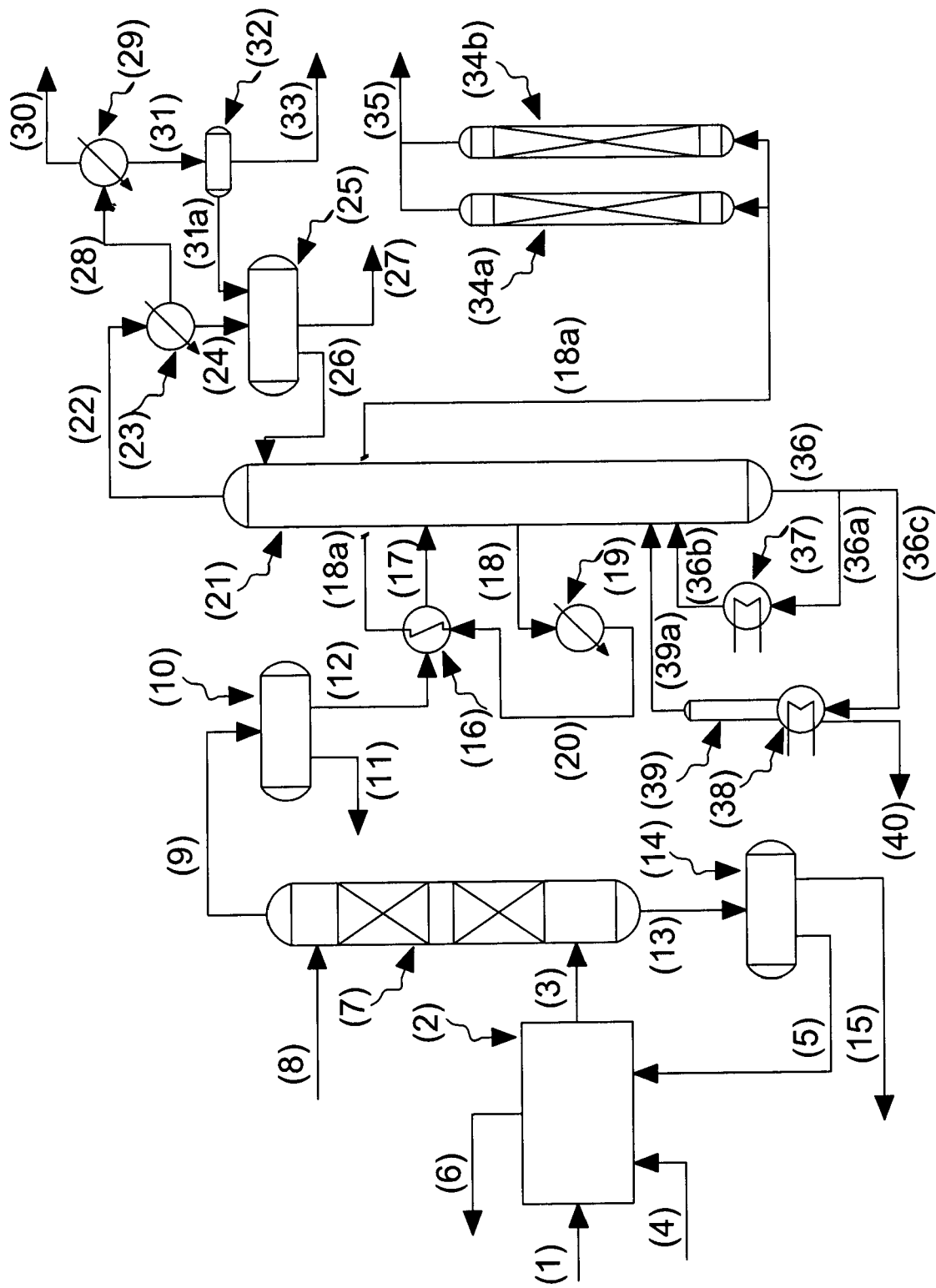

PROCESS FOR THE PURIFICATION OF THE SOLVENT DERIVING FROM THE PRODUCTION OF ELASTOMERIC BLENDS

The present invention relates to a process for the purification of the solvent deriving from the production of elastomeric blends.

More specifically, the present invention relates to a process for the purification of the solvent deriving from the production of an elastomeric blend comprising the following steps: (a) optionally, subjecting said solvent to a pre-washing in the presence of at least one acid or basic aqueous solution; (b) feeding said solvent to a liquid-liquid separation column; (c) feeding the stream leaving the head of said liquid-liquid separation column to an azeotropic distillation column; (d) feeding the stream withdrawn laterally (side-withdrawal) from said azeotropic distillation column to an adsorption section; wherein in step (b), water is fed in countercurrent to said liquid-liquid separation column.

Said process allows to obtain a polymer grade solvent having a quality suitable for being used indifferently and contemporaneously in various types of production plants of elastomeric (co)polymers, i.e. in plants wherein an anionic (co)polymerization is carried out, and also in plants wherein a Ziegler-Natta (co)polymerization is carried out.

It is known that the elastomeric blends used for the production of tyres require the use of one or more elastomeric (co)polymers, of both a natural origin such as, for example, polyisoprene from *Hevea brasiliensis*, or polyisoprene from *Parthenium argentatum* (guayule), and also of a synthetic origin. Among elastomeric (co)polymers of a synthetic origin, in the elastomeric blends used in tyres tread and sidewalls, wide use is made of elastomeric (co)polymers mainly obtained by (co)polymerization, in a hydrocarbon solution, typically in the presence of hydrocarbon solvents having from 5 to 7 carbon atoms, with two distinct and non-overlapping processes: i.e. anionic (co)polymerization in order to obtain, for example, styrene-butadiene copolymers (SB), styrene-butadiene-styrene (SBS) copolymers, styrene-butadiene-styrene-butadiene (SBSB) copolymers, having a block, random, tapered, configuration, polybutadiene (BR) with a low content of 1,4-cis units; or Ziegler-Natta (co)polymerization in order to obtain, for example, polybutadiene (BR) with a very high content of 1,4-cis units, butadiene-isoprene copolymers, polyisoprene (IR).

Said (co)polymerizations in solution allow to obtain polymeric solutions comprising at least one elastomeric (co)polymer, wherein said (co)polymer is generally present in a quantity ranging from 8% by weight to 30% by weight with respect to the total weight of said polymeric solution, the remaining essentially consisting of the solvent.

The catalytic systems used in anionic (co)polymerization or in Ziegler-Natta (co)polymerization, have different characteristics which allow specific properties to be conferred to the (co)polymers thus obtained.

In particular, anionic (co)polymerization which envisage the use of lithium-alkyl initiators in hydrocarbon solvents, is of the "living" type (i.e. the subsequent addition of one of the monomers takes place with the same introduction rate as the previous units) and, due to the absence of termination and of transfer reactions, the molecular weight of the (co)polymer obtained is determined by the ratio between the moles of monomer and those of the active lithium-alkyl initiator. Furthermore, the presence of polar substances (for example, ethers, amines, alcohols), called "activators", causes a consumption of lithium-alkyl initiator and modifies the molecular weight of the (co)polymer obtained, completely changing its properties: if said polar substances are used, the hydrocarbon solvent is added with an accurately controlled quantity of said polar substances, typically cyclic ethers, that allow the (co)polymerization reaction to become regular and rapid. Anionic (co)polymerization, generally, allows to obtain homopolymers or copolymers having a random, block, tapered configuration, with a definite macro- and micro-structure.

Ziegler-Natta (co)polymerization, on the other hand, in hydrocarbon solvents, through the formation of a catalytic complex based on the presence of organometallic compounds, is capable of generating polymeric chains with a high stereospecificity. The catalysts of the Ziegler-Natta type normally used, are prepared by reacting salts or complexes of titanium, cobalt, or nickel, with aluminium alkyls. Other catalysts of the Ziegler-Natta type, more recents and with a higher performance, are those based on salts of organic acids of lanthanides, especially neodymium, and are capable of producing elastomeric (co)polymers with a high isomeric purity. In particular, the use of catalytic systems based on neodymium, allows to obtain polybutadienes having a content of 1,4-cis units equal to or higher than 96%. The reactivity of neodymium-based catalytic systems, based on organic salts of neodymium (carboxylates), aluminium alkyls and aluminium alkyl halides or reactive halides, is influenced by the aluminium/neodymium/halogen (generally, chlorine) ratio. In this context, the molecular weight decreases with an increase in the catalyst/monomer ratio.

The presence in the solvent of traces of water, and of optional unreacted monomers, and the production of poisons due to both the residues of the (co)polymerization reaction (for example, ethers, amines, alcohols, quenching agents of the reaction), and also to contaminants present in the compounds used in said (co)polymerization reaction, makes it necessary to subject said solvent to a complex purification treatment in order to obtain a residual level of contaminants that allows it to be recycled and re-used in said (co)polymerization reaction: it should be pointed out that when operating according to the purification technologies currently available, the solvent subjected to purification treatment at the end of the anionic (co)polymerization is not adequate for being re-used in the Ziegler-Natta (co)polymerization and, viceversa, the solvent subjected to purification treatment at the end of the Ziegler-Natta (co)polymerization is not adequate for being re-used in the anionic (co)polymerization. Consequently, when operating according to the purification technologies currently available, the use of the solvent subjected to purification at the end of the (co)polymerization indifferently in the two different catalytic systems, would be extremely complex from a technical point of view (or even virtually impossible) and economically unfavourable due to the difficulty in controlling the (co)polymerization reaction and in particular in controlling the molecular-weight distribution of the (co)polymers to be obtained, that differs according to the various final applications.

Similarly, the solvent deriving from the production of elastomeric blends, in particular from the production of elastomeric blends based on silica, obtained starting from a polymeric solution comprising at least one elastomeric (co)polymer, i.e. from a compounding section wherein the mixing is carried out between the polymeric solution deriving from the production of elastomeric (co)polymers, at least one filler (for example, silica) and at least one filler activator (for example, silane), which contains ethanol as main residue in a high concentration (typically 2% by weight with respect to the total weight of the solvent), said ethanol being generated by the silanization reaction, is practically to date not used either in anionic (co)polymerization processes or in Ziegler-Natta (co)polymerization processes. The purification processes of said solvent currently available such as, for example, distillation, adsorption, are not in fact sufficient for providing a polymer grade solvent, or are extremely expensive and consequently not advantageous from an industrial point of view. The production of elastomeric blends based on silica used for the production of green tyres with improved rolling resistance and wet grip, is currently carried out using solvent-free elastomeric (co)polymers that are mixed, in the absence of solvent(s), with at least one filler (for example, silica) and at least one filler activator (for example, silane).

Furthermore, the solvent purification technologies currently available, not only have the drawbacks reported above, but also do not have a flexibility which is such as to allow solvents deriving from different (co)polymerization processes and, consequently, having different levels of contamination, such as for example, anionic (co)polymerization or Ziegler-Natta (co)polymerization, or solvents deriving from the production of elastomeric blends, in particular of elastomeric blends based on silica which, as reported above, contain high concentrations of ethanol, to be treated indifferently.

For example, in the case of solvents deriving from the production of elastomeric blends, in particular of elastomeric blends based on silica, the contaminants present such as ethanol, other alcohols having up to 6 carbon atoms, the corresponding organic acids, open- or closed-chain ethers, cannot be separated, if not in part, from the solvent by passage in an azeotropic distillation section, even if particular elaborate distillation systems are used such as, for example, double distillation columns arranged in series, as said contaminants have a boiling point close to that of the solvent, or form azeotropic mixtures close to this value. In particular, in the case of hydrocarbon solvents normally used in the production of elastomeric (co)polymers (for example, n-hexane, cyclohexane, iso-pentane, cyclopentane), the ethanol almost totally passes into the solvent essentially water-free at the end of said azeotropic distillation.

In relation to the characteristics of the (co)polymerization process used for the production of elastomeric (co)polymers and to the quality of the solvent obtained after the above azeotropic distillation, in order to obtain a polymer grade solvent, it may be necessary to envisage the use, downstream of said azeotropic distillation, of an adsorption section on beds of zeolites or of activated aluminas to mainly remove the water. Ethanol and other alcohols or organic acids or ethers optionally present could also, under certain operational conditions, be removed by the passage of the solvent on adequate beds of zeolites or of activated aluminas, but the presence of water and of competitive species, among which unreacted monomers, makes this adsorption process extremely onerous and not always effective, which in any case would not have a significant impact on problems of cross-contamination should the solvent obtained indifferently either in plants wherein an anionic (co)polymerization is carried out, or in plants wherein a Ziegler-Natta (co)polymerization is carried out, be used.

Some processes destined for the purification of small quantities of solvent envisage the removal of water exclusively on beds of zeolite, but this plant configuration against lower initial costs, requires high variable costs as said beds of zeolite must be subjected to frequent regeneration operations and substituted periodically. Furthermore, the passage on said beds of zeolite is not able to completely and reliably remove contaminants with a molecular size similar to that of the solvent or with a much lower polarity charge than that of water (for example, alcohols, organic acids, and the like). In addition, whereas in the case of anionic (co)polymerization the conversion of the monomers is virtually complete, in the case of Ziegler-Natta (co)polymerization, the purification treatment of the solvent is further complicated, in particular with respect to the azeotropic distillation, by the presence of unreacted monomers as the conversion of the monomers, for example 1,3-butadiene or isoprene, is generally not complete and is around 97%-99%. For example, in the case of the use of n-hexane as Ziegler-Natta (co)polymerization solvent and of beds of type 4A zeolites, universally used for the removal of ethanol, the unreacted 1,3-butadiene is withheld in the pores of said beds of zeolite preventing their regeneration: at the high temperatures at which the regeneration is carried out, in fact, the 1,3-butadiene undergoes cracking causing the irreversible clogging of the pores of said beds of zeolite, consequently making their frequent substitution necessary.

The Applicant has therefore considered the problem of finding a process for the purification of the solvent deriving from the production of an elastomeric blend, in particular from the production of an elastomeric blend based on silica, capable of overcoming the drawbacks reported above and of giving a polymer grade solvent having a quality suitable for being used indifferently and contemporaneously in various types of production plants of elastomeric (co)polymers, i.e. in plants wherein an anionic (co)polymerization is carried out, and also in plants wherein a Ziegler-Natta (co)polymerization is carried out.

The Applicant has now found that the purification of the solvent deriving from the production of an elastomeric blend, in particular from the production of an elastomeric blend based on silica, comprising the following steps: (a) optionally, subjecting said solvent to a pre-washing in the presence of at least one acid or basic aqueous solution; (b) feeding said solvent to a liquid-liquid separation column; (c) feeding the stream leaving the head of said liquid-liquid separation column to an azeotropic distillation column; (d) feeding the stream withdrawn laterally (side-withdrawal) from said azeotropic distillation column to an adsorption section; wherein in step (b) water is fed in countercurrent to said liquid-liquid separation column, is capable of overcoming the above drawbacks. Said process, in fact, allows to substantially remove the polar and/or water-soluble contaminants such as, for example, alcohols, in particular ethanol, organic acids, ethers, low-molecular-weight silanols in the case of the presence of silanes as coupling agents, polar catalytic residues or acids deriving from anionic (co)polymerization or Ziegler-Natta (co)polymerization, unreacted monomers, in particular in the case of Ziegler-Natta (co) polymerization, and to obtain a polymer grade solvent having a quality suitable for being used indifferently and contemporaneously in various types of production plants of elastomeric (co)polymers, i.e. in plants wherein an anionic (co)polymerization is carried out, and also in plants wherein a Ziegler-Natta (co)polymerization is carried out.

An object of the present invention therefore relates to a process for the purification of the solvent deriving from the production of an elastomeric blend comprising the following steps:

(a) optionally, subjecting said solvent to a pre-washing in the presence of at least one acid or basic aqueous solution;

(b) feeding said solvent to a liquid-liquid separation column;

(c) feeding the stream leaving the head of said liquid-liquid separation column to an azeotropic distillation column;

(d) feeding the stream withdrawn laterally (side-withdrawal) from said azeotropic distillation column to an adsorption section;

wherein in step (b), water is fed in countercurrent to said liquid-liquid separation column For the purpose of the present description and of the following claims, the definitions of the numerical ranges always comprise the extremes unless otherwise specified.

For the purpose of the present description and of the following claims, the term "comprising" also includes the terms "which essentially consists of" or "which consists of".

Said elastomeric blend can be obtained according to methods known in the art, for example, by mixing a polymeric solution comprising at least one elastomeric (co)polymer, said polymeric solution being obtained by means of (co)polymerization in solution, with at least one filler and at least one filler activator.

For the purpose of the present description and of the following claims, the term "elastomeric blend(s)" also refers to "elastomeric masterbatch(es)".

In particular, said elastomeric blend (or elastomeric masterbatch) can be obtained, for example, as described in international patent application WO 2015/018278, WO 2015/109791, WO 2015/109792, and in the Chinese patent applications CN 104387625, CN 104327318, CN10477255, CN 104403380 and CN 104356407.

It should also be pointed out that the elastomeric (co)polymers in solution, obtained both in plants wherein an anionic (co)polymerization is carried out, and also in plants wherein a Ziegler-Natta (co)polymerization is carried out, wherein the purified solvent deriving from the process object of the present invention, is used, can be advantageously utilized in the preparation of elastomeric blends (or elastomeric masterbatches) according to the above-mentioned patent applications.

Said polymeric solution preferably comprises at least one elastomeric (co)polymer that can be selected, for example, from elastomeric (co)polymers deriving from anionic (co)polymerization in solution, or from elastomeric (co)polymers deriving from Ziegler-Natta (co)polymerization in solution, said elastomeric (co)polymers deriving from Ziegler-Natta (co)polymerization, having a polydispersion index $M_w/M_n$ [i.e. a ratio between the weight average molecular weight ($M_w$) and the number average molecular weight ($M_n$)] ranging from 1.8 to 6. Said elastomeric (co)polymer can be preferably selected, for example, from: polybutadiene (BR) having a weight average molecular weight ($M_w$) ranging from 50,000 to 3,000,000; polyisoprene (IR) having a weight average molecular weight ($M_w$) ranging from 50,000 to 3,000,000; butadiene-isoprene copolymers having a block or random configuration, having a weight average molecular weight ($M_w$) ranging from 50,000 to 3,000,000; unsaturated styrene copolymers, having a block, random, tapered distribution, linear or branched, having a weight average molecular weight ($M_w$) ranging from 50,000 to 3,000,000 such as, for example, styrene-butadiene (SB) copolymers, styrene-butadiene-styrene (SBS) copolymers, styrene-isoprene-styrene (SIS) copolymers; saturated styrene copolymers, with a random, block, tapered distribution, linear or branched such as, for example, styrene-ethylene-propylene (SEP) copolymers, styrene-ethylene/butylene-styrene (SEBS) copolymers, styrene-ethylene-propylene-styrene (SEPS) copolymers; or mixtures thereof; or it can be selected, for example, from said elastomeric (co)polymers wherein the olefinic part has been completely or partially hydrogenated.

Said (co)polymerization in solution is preferably carried out in the presence of at least one solvent, more preferably of at least one aliphatic, cycloaliphatic or aromatic solvent, having from 5 to 7 carbon atoms such as, for example, n-hexane, n-heptane, iso-pentane, cyclopentane, cyclohexane, toluene, or mixtures thereof.

For the purpose of the present invention, said solvent can be selected from solvents commercially available having a titer ranging from 35% by weight to 100% by weight, which optionally contain other hydrocarbon fractions, said hydrocarbon fractions mainly consisting of their isomers.

In the case of the use of commercial cyclopentane as solvent, for example, the other hydrocarbon fractions typically present are mainly pentanes, methylbutenes, pentenes, methylbutanes, hexanes; whereas, in the case of the use of commercial n-hexane as solvent, the other hydrocarbon fractions typically present are mainly iso-pentane, cyclopentane, dimethylbutanes, methylpentanes, cyclohexane, and other hydrocarbons. In both cases, contaminants can also be present such as, for example, aromatic compounds, traces of benzene, toluene, ethylbenzene, water, said water generally being present in a quantity ranging from 200 ppm to 300 ppm, preferably not exceeding the solubility limit of the same in the solvent.

For the purpose of the present invention, said (co)polymerization is carried out anionically or via Ziegler-Natta, operating as known in the art.

Said filler can be selected, for example, from silica, carbon black, or mixtures thereof, preferably is silica. Said filler activator is preferably selected from organic silanes.

Said elastomeric blend can also comprise other compounds such as, for example, vulcanizing agents, accelerants, vulcanization inhibitors, filler activators, ozone protection agents, aging inhibitors, antioxidants, processing aids, extender oils, plasticizers, reinforcing materials, mould releasing agents.

As already reported above, said elastomeric blend can be obtained by mixing the polymeric solution comprising at least one elastomeric (co)polymer with at least one filler, with at least one filler activator and with other additives optionally present, according to techniques known in the art. Said mixing can be carried out, for example, using an open mixer of the "open-mill" type, or an internal mixer of the tangential rotor type (Banbury) or with interlocking rotors (Intermix), or in continuous mixers of the "Ko-Kneader" (Buss) type or of the co-rotating or counter-rotating twin-screw type.

For the purpose of the present invention, said elastomeric blend is subjected to a "demedium" step in order to separate the solvent that will be subsequently subjected to the process object of the same. Said "demedium" step can be carried out according to processes known in the art such as, for example, stripping in a vapour stream, direct devolatilization.

It should be noted that the solvent obtained in the "demedium" step, in addition to comprising alcohols, in particular ethanol deriving from the silanization reaction in the case of the production of elastomeric blends based on silica, organic acids, ethers [for example, cyclic ethers in the case of (co)polymers deriving from anionic (co)polymerization], low-molecular-weight silanols in the case of the presence of silanes as filler activators, polar or acid catalytic residues deriving from anionic (co)polymerization or from Ziegler-Natta (co)polymerization, unreacted monomers, in particular in the case of Ziegler-Natta (co)polymerization, is saturated with water and can comprise residues of antioxidants optionally added at the end of the (co)polymerization in solution.

Depending on the characteristics of the contaminants present in said solvent and on their concentration, in particular when said contaminants must be chemically removed, said solvent can be optionally subjected to said pre-washing step (a).

Said pre-washing step (a) can be carried out in a single step, or in two steps.

According to a preferred embodiment of the present invention, in said step (a), the acid aqueous solution can be selected from aqueous solutions comprising at least one acid selected, for example, from sulfuric acid or carboxylic acids preferably comprising 7-8 carbon atoms, or mixtures thereof; whereas the basic aqueous solution can be selected from aqueous solutions comprising at least one base selected, for example, from sodium hydroxide, sodium bicarbonate, potassium hydroxide, potassium bicarbonate, or mixtures thereof.

For the purpose of the present invention, said acid or basic aqueous solution and the relative pH are defined so as to allow the neutralization of the specific contaminant to be removed from the solvent and can be typically fed at a nominal flow-rate ranging from 5% to 50% of the nominal flow-rate of the solvent.

If the contaminant to be chemically removed is para-tert-butyl-catechol (TBC), for example, a pre-washing system with a hot solution of sodium hydroxide can be used, at a temperature ranging from 30° C. to 90° C., followed by a washing in countercurrent with water, at a temperature ranging from 20° C. to 60° C., both washings carried out with a closed circuit to minimize the formation of streams to be sent for ecological treatment.

It should be noted that if the solvent has a concentration of ethanol (or other contaminant having a similar reactivity among those reported above) higher than or equal to 2,000 ppm (said concentration of ethanol depends on the production process of the elastomeric blend from which the solvent derives and forms the contaminant prevalently present, in particular in the case of the solvent deriving from the production of elastomeric blends based on silica), the process object of the present invention envisages that the aqueous stream leaving the bottom of the liquid-liquid separation column, previously sent to a separator equipped with a coalescence system (coalescer), also be sent to said pre-washing step (a), so as to withhold most of the ethanol present, in order to minimize the water consumption and not to impact the dimensioning of said liquid-liquid separation column too heavily.

According to a preferred embodiment of the present invention, in said step (b), the solvent can be fed to said liquid-liquid separation column at a temperature ranging from 20° C. to 100° C., preferably ranging from 25° C. to 80° C., more preferably ranging from 30° C. to 60° C.

According to a preferred embodiment of the present invention, in said step (b), said liquid-liquid separation column can be maintained at a pressure ranging from 0.1 MPaG to 1.5 MPaG, preferably ranging from 0.15 MPaG to 1.0 MPaG, more preferably ranging from 0.2 MPaG to 0.7 MPaG.

For the purpose of the present invention, a liquid-liquid separation column composed of fixed plates for distillation and/or stripping columns, of movable or rotating plates, or of fillings of the structure or non-structured type, can be used.

For the purposes of the process object of the present invention, in said step (b), the solvent is fed from the bottom of the liquid-liquid separation column in countercurrent with respect to the water. In said liquid-liquid separation column, the separation of the phases immiscible to each other takes place by gravity, the continuous phase can be both the organic phase or the aqueous phase, preferably the aqueous phase, said aqueous phase being capable of providing the best exchange efficiency of material, as water, as the continuous phase, ensures a better wettability of the fillings present in said liquid-liquid separation column and an excellent functioning stability.

According to a preferred embodiment of the present invention, in said step (b), the solvent can be fed to said liquid-liquid separation column, at a nominal flow-rate ranging from 100 kg/min to 15,000 kg/min, preferably ranging from 250 kg/min to 10,000 kg/min.

According to a preferred embodiment of the present invention, in said step (b), the water can be fed in countercurrent to said liquid-liquid separation column, at a nominal flow-rate ranging from 5% to 100%, preferably ranging from 15% to 50% of the nominal flow-rate of the solvent.

According to a preferred embodiment of the present invention, in said step (b), the water can be fed in countercurrent to said liquid-liquid separation column, at a temperature ranging from 20° C. to 100° C., preferably ranging from 25° C. to 80° C., more preferably ranging from 30° C. to 60° C.

The water fed in countercurrent to said step (b) is preferably demineralized water. Said water can also be condensed water previously undercooled.

The stream leaving the head of said liquid-liquid separation column comprises solvent having a content of contaminants, referring to the two main contaminants, i.e. water and ethanol, in a quantity ranging from 200 ppm to 300 ppm, preferably not exceeding the solubility limit of the same in the solvent with respect to the water, and ranging from 5 ppm to 10 ppm with respect to the ethanol.

According to a preferred embodiment of the present invention, said stream leaving the head of said liquid-liquid separation column can be fed to said azeotropic distillation column, at a temperature that depends on the solvent used: for example, in the case of cyclopentane, it ranges from 20° C. to 70° C., preferably from 25° C. to 60° C., more preferably from 30° C. to 45° C.; in the case of n-hexane, it ranges from 20° C. to 80° C., preferably from 25° C. to 70° C., more preferably from 30° C. to 55° C.

According to a preferred embodiment of the present invention, in said step (c), said azeotropic distillation column can be maintained at a pressure ranging from 0.01 MPaG to 0.4 MPaG, preferably ranging from 0.03 MPaG to 0.3 MPaG, more preferably ranging from 0.04 MPaG to 0.25 MPaG.

For the purpose of the present invention, an azeotropic distillation column composed of fixed plates for distillation and/or stripping columns, or of fillings of the structure or non-structured type, can be used.

According to a preferred embodiment of the present invention, in said step (c), the stream leaving the head of said liquid-liquid separation column can be fed to said azeotropic distillation column at a nominal flow-rate ranging from 100 kg/min to 20,000 kg/min, preferably ranging from 250 kg/min to 10,000 kg/min.

In order to remove optional entrainments of water, said stream leaving the head of said separation column before being fed to said azeotropic distillation column [step (c)], can be fed to a separator equipped with a coalescence system (coalescer).

According to a preferred embodiment of the present invention, said stream leaving the head of said liquid-liquid separation column before being fed to said azeotropic distillation column [step (c)], can be fed to a separator equipped with a coalescence system (coalescer) obtaining a stream of solvent essentially free of water-soluble contaminants and an aqueous stream comprising solvent and contaminants, said contaminants being present in a concentration at most equal to the limit of their solubility in said solvent.

For the purpose of the present description and of the following claims, the phrase "solvent essentially free of water-soluble contaminants" means that in said solvent, said contaminants, if present, (for example ethanol) are present in a quantity lower than or equal to 5 ppm.

According to a preferred embodiment of the present invention, said stream leaving the head of said liquid-liquid separation column or said stream of solvent essentially free of contaminants, before being fed to said azeotropic distillation column [step (c)], can be fed to a storage container.

According to a preferred embodiment of the present invention, the stream leaving the bottom of said liquid-liquid separation column can be sent to a separator equipped with a coalescence system (coalescer), obtaining: an aqueous stream comprising solvent in a quantity ranging from 15 ppm to 500 ppm, preferably ranging from 20 ppm to 200 ppm, and contaminants dissolved in said solvent at the temperature of said stream, said temperature being preferably ranging from 20° C. to 100° C., more preferably ranging from 25° C. to 80° C., even more preferably ranging from 30° C. to 60° C., which will be subsequently subjected to further treatments in order to eliminate the contaminants present, and an aqueous stream comprising solvent optionally deriving from the coalescence of the solvent that has a concentration of contaminants given by the distribution coefficient of the single substances, but in practice it contributes minimally to the closure of the material balance.

In order to condense and undercool the stream withdrawn laterally (side withdrawal), said stream being in gas phase, said stream can be sent to a condenser and subsequently to a heat exchanger.

According to a preferred embodiment of the present invention, before said step (d), the stream withdrawn laterally (side withdrawal) can be sent to a condenser and subsequently to a heat exchanger.

According to a preferred embodiment of the present invention, said adsorption section envisages passage on beds of zeolites and/or of activated aluminas, preferably on beds of zeolites (for example, zeolites of the type 3A, 4A, 13X), optionally with an activated surface, or mixtures thereof, or mixed systems of aluminas/silica gel/zeolites.

The adsorption beds are controlled by the use of instruments online capable of determining as marker, the residual concentration of water and of contaminants present (for example, ethanol): for these contaminants, the purification of the solvent is pushed to the traceability limits of the instruments online and in any case below 1 ppm. It should be noted that at the outlet of said adsorption section, the solvent is essentially water-free.

For the purpose of the present description and of the following claims, the phrase "solvent essentially water-free" means that in said solvent, if present, said water is present in a quantity lower than 1 ppm.

In order to remove any unreacted monomers optionally present, minimizing losses of solvent, the stream leaving the head of said azeotropic distillation column can be treated as follows.

According to a preferred embodiment of the present invention, the gaseous stream leaving the head of said azeotropic distillation column, comprising solvent, light contaminants and water vapour, can be sent to a first partial condenser obtaining a liquid stream which is sent to a gravity separator that acts as a reflux accumulator of said azeotropic distillation column and a first stream in vapour phase that is sent to a second partial condenser that functions with cooling fluid that separates the lighter fractions of said first stream in vapour phase obtaining a second stream in vapour phase comprising light contaminants that is subsequently sent to an incineration system, and a biphasic liquid stream (water/solvent) that is sent to a small-capacity tank used for allowing the correct functioning of the process. The separation of the organic liquid phase from the aqueous liquid phase contained in said biphasic liquid stream (water/solvent) also takes place in said small-capacity tank and the organic phase is recycled to said gravity separator. If the quantity of solvent recovered from said second partial condenser, stored in said tank and re-sent to said gravity separator, exceeds the quantity necessary for guaranteeing the correct reflux ratio of said azeotropic distillation column, or if it is decided to rapidly remove the light contaminants from the solvent, part of the liquid stream present in said tank is sent to an accumulation tank of the waste solvent.

Two streams are obtained at the outlet of said gravity separator: a stream comprising the aqueous phase generated by the condensation of the water leaving the head of said azeotropic distillation column, which is sent to a water collection and treatment system, and a liquid stream comprising solvent and light contaminants which is recycled to said azeotropic distillation column.

In order to remove the heavier contaminants such as, for example, dimers, residues of antioxidants optionally added at the end of the (co)polymerization in solution, aromatic substances, modifiers used in the anionic (co)polymerization, minimizing solvent losses, the stream leaving the bottom of said azeotropic distillation column can be treated as follows.

According to a preferred embodiment of the present invention, the stream leaving the bottom of said azeotropic distillation column can be partly sent to a first reboiler to be vaporized and recycled to said azeotropic distillation column, and partly, in order to partially recover the solvent, to a second reboiler, preferably of the Kettle type, equipped with a small distillation column with plates or filling elements wherein the partial vaporization is completed and the stream leaving the head of said small distillation column comprising the solvent is recycled to the azeotropic distillation column.

A stream comprising solvent in a minimum quantity and, in a larger quantity, heavy contaminants that are present in the solvent which is used in the (co)polymerization (make-up solvent) and/or generated by the production process of (co)polymers (for example, unreacted heavy monomers, ethers, amines, alcohols, quenching agents of the reaction), leaves the bottom of the second reboiler of the Kettle type, and is sent to an accumulation tank of the waste solvent.

The present invention will now be illustrated in greater detail through an illustrative embodiment with reference to FIG. 1 provided hereunder.

FIG. 1 illustrates an embodiment of the process object of the present invention.

As represented in FIG. 1, the recycled solvent (1) deriving, for example, from the production of an elastomeric blend (or elastomeric masterbatch) based on silica (i.e. from a compounding section), saturated with water and comprising the contaminants reported above, is fed to a pre-washing section (2) to which an acid or a basic aqueous solution (4) is fed in order to neutralize the contaminants present together with the aqueous stream (5) leaving the separator (14) equipped with a coalescent system (coalescer).

The stream of solvent (3) leaving the pre-washing section (2) has been purified of the contaminants neutralized in said pre-washing section (2) and of part of the ethanol, as it is required that the concentration of ethanol entering with the stream (3) the liquid-liquid separation column (7) should never exceed 2,000 ppm so as not to overdimension said liquid-liquid separation column (7). The stream (6) leaving the pre-washing section (2) comprising the contaminants extracted from the solvent in said pre-washing section (2), is sent to a collection and treatment system (not represented in FIG. 1).

A stream of water (8) is fed to the head of said liquid-liquid separation column (7), in countercurrent with respect to the solvent entering the bottom of said liquid-liquid separation column (7).

The stream (9) leaving the head of said liquid-liquid separation column (7), saturated with water, is sent to a separator (10) equipped with a coalescence system (coalescer) to remove drops of water optionally present, obtaining two streams: a stream (12) comprising solvent essentially free of water-soluble contaminants which is fed to the azeotropic distillation column (21) as stream (17), said stream (17) having been pre-heated in the heat exchanger (16) and an aqueous stream (11) comprising solvent and contaminants, said contaminants being present at their solubility limit in said solvent, which is sent, as stream (6), to a collection and treatment system (not represented in FIG. 1). Said stream (17) is fed to the azeotropic distillation column (21) in a plate situated between the head, wherein the light contaminants (the azeotropic water/solvent mixture, the light hydrocarbons present, part of the ethanol that also forms ternary azeotropes with solvent and water) are concentrated, and the plate where the side withdrawal is carried out, reported in FIG. 1 as stream (18).

Said stream (12) can also be sent, temporarily, to a storage container (not represented in FIG. 1), to allow an ample flexibility of the purification system and also a periodic feeding of fresh make-up solvent to compensate the production losses: in this case, the azeotropic distillation column (21) can be fed with the solvent deriving from said storage container which comprises both fresh make-up solvent, and recycled solvent.

The stream (13) leaving the bottom of said liquid-liquid separation column (7) is sent to a separator (14) equipped with a coalescence system (coalescer) from which two streams are obtained: an aqueous stream (5) comprising solvent optionally entrained by the aqueous phase, and contaminants at a concentration given by the distribution coefficient of the single substances, but in practice it contributes minimally to the closure of the material balance which is sent to said pre-washing section (4), and an organic stream (15) comprising solvent and contaminants solubilized in said solvent at the temperature of said stream, which does not allow its recycling to the process and is therefore sent to an accumulation tank of waste solvent (not represented in FIG. 1).

At the head of said azeotropic distillation column (21) it is obtained a gaseous stream comprising solvent, light contaminants and water vapour (22) which is sent to a first partial condenser (23) from which a liquid stream (24) exits, which is sent to a gravity separator (25) which acts as a reflux accumulator of the azeotropic distillation column (21) and a first stream in vapour phase (28) that is sent to a second partial condenser (29) that functions with cooling fluid that separates the lighter fractions of said first stream in vapour phase (28). The accumulation of the light contaminants and of the incondensable products at the head of said azeotropic distillation column (21) is then prevented by purging said light contaminants by means of a second stream in vapour phase (30) towards an incineration system (not represented in FIG. 1), and also by means of a biphasic liquid stream (water/solvent) (31) leaving said second partial condenser (29) which is sent to the tank (32). The tank (32), having a small capacity, is used for allowing the correct functioning of the process object of the present invention. The separation of the organic liquid phase from the aqueous liquid phase contained in said biphasic liquid stream (water/solvent) also takes place in said small-capacity tank and the organic phase [stream (31a)] is recycled to said gravity separator (24): if the quantity of solvent recovered from said second partial condenser (29) and stored in said tank (32) and re-sent [stream (31a)] to said gravity separator (24), exceeds the quantity necessary for guaranteeing the correct reflux ratio of said azeotropic distillation column (21), or if it is decided to rapidly remove the light contaminants from the solvent, part of the liquid stream (31a) present in said tank (32) is sent [stream (33)], as in the case of stream (15), to an accumulation tank of the waste solvent (not represented in FIG. 1).

Two streams are obtained at the outlet of said gravity separator (25): a stream (27) comprising the aqueous phase generated by the condensation of the water, condensation which takes place in said first partial condenser (23), leaving the head of said azeotropic distillation column (21), which is sent to a water collection and treatment system (not represented in FIG. 1), and a liquid stream (26) comprising solvent and light contaminants which is recycled to said azeotropic distillation column (21).

The aqueous stream (36) leaving the bottom of said azeotropic distillation column (21) can be partly sent [stream (36a)] to a first reboiler (37) to be vaporized and recycled to said azeotropic distillation column (21) [stream (36b)], and partly [stream (36c)], in order to partially recover the solvent, to a second reboiler (38), preferably of the Kettle type, equipped with a small distillation column with plates or filling elements (39) wherein the partial vaporization is completed and the stream (39a) leaving the head of said small distillation column (39) comprising the solvent is recycled to the azeotropic distillation column (21).

The stream (40) comprising solvent in a smaller quantity and, in a larger quantity, heavy contaminants that are present in the solvent which is used in the (co)polymerization (make-up solvent) and/or generated by the production process of (co)polymers (for example, unreacted heavy monomers, ethers, amines, alcohols, quenching agents of the reaction), leaving the bottom of said second reboiler of the Kettle type (38), is sent to an accumulation tank of waste solvent (not represented in FIG. 1) as streams (15) and (33).

The stream of solvent (18) withdrawn laterally (side withdrawal), in gas phase, from said azeotropic distillation column (21), which is now comparable to a polymer grade solvent, after being condensed [stream (20)] by passage in the condenser (19) and undercooled downstream of the heat exchanger (16), is then sent [stream (18a)] to a series of adsorption columns (34a) and (34b) acting as purity guard of the solvent: as marker of the purity of the polymer grade solvent exiting as stream (35), the concentrations of water and ethanol, that must both be below 1 ppm, are controlled. The columns are always operating so as to ensure a qualitative constancy of the solvent also in the case of upset of the azeotropic distillation column (21).

The solvent [stream (35)] leaving the adsorption columns (34a) and (34b) is capable of indifferently and contemporaneously feeding both an anionic (co)polymerization process and also a Ziegler-Natta (co)polymerization process.

Some illustrative and non-limiting examples are provided for a better understanding of the present invention and for its embodiment.

EXAMPLE 1

Anionic Polymerization in the Presence of a Solvent Deriving from a "Demedium" Process A solvent coming from a compounding section wherein wet mixing was carried out, i.e. the mixing of polymeric solutions and subsequent "demedium" process by stripping in a stream of vapour, having the composition reported in Table 1, was used for an anionic polymerization test at a laboratory level.

The composition of the above solvent was obtained by means of gas-chromatography using an Agilent HP6890 gas-chromatograph equipped with a HP-1 column (60 m×0.25 mm×1 micron film), operating under the following conditions:
  carrier: helium 5.05 psi;
  temperature: −10° C. for 2 min, 7° C./min up to 150° C., 150° C. for 2 min, 7° C./min up to 280° C., 280° C. for 12 min;
  injector: 260° C.;
  detector FID: 300° C.;
  injection volume: 1 µl;
and by means of gas-chromatography/mass using a GC 5977A gas-chromatograph equipped with a polar column VF-WAXms (60 m×0.25 mm×0.25 micron film), operating under the following conditions:
  carrier: helium 28 cm/sec, 60° C.;
  temperature: 60° C. for 10 min, 6° C./min up to 120° C., 15° C./min up to 230° C., 230° C. for 40 min;
  injector: 220° C.;
  split: 10 ml/min;
  MSD detector;
  injection volume: 2 µl.

The quantity of water present was determined via the Karl-Fischer method.

TABLE 1

Composition of solvent deriving from a "demedium" process

| Composition | | |
|---|---|---|
| n-hexane | % | 84.34 |
| 2-methyl-pentane | % | 2.57 |
| 3-methyl-pentane | % | 7.68 |
| methyl-cyclopentane | % | 5.31 |
| cyclohexane | % | 0.10 |
| water | ppm | 150 |
| tetraethyl-silicate | ppm | 3 |
| amyl-triethoxy-silane | ppm | 4 |

TABLE 1-continued

Composition of solvent deriving from a "demedium" process

| Composition | | |
|---|---|---|
| 2-chloro-propyl-triethoxy-silane | ppm | 2 |
| ethanol | ppm | 100 |

500 g of solvent having the composition reported in Table 1, 0.70 g of polar modifier (tetrahydrofurfuryl-ethyl-ether) (corresponding to 1,400 ppm with respect to the solvent charged) were introduced into a stirred 1-litre reactor, followed by 70 g of 1,3-butadiene. The reaction mixture obtained was heated to a temperature of 50° C. by means of a heating jacket. 0.81 g of a solution of lithium n-butyl (NBL) at 15% by weight in n-hexane equal to 0.00190 moles, were then added. The polymerization did not take place due to the quantity of contaminants present in the solvent.

EXAMPLE 2

Ziegler-Natta Polymerization in the Presence of a Solvent Deriving from a "Demedium" Process A solvent coming from a "demedium" process having the composition reported in Table 1, was used for a Ziegler-Natta polymerization test at a laboratory level.

450 g of the solvent reported in Table 1, and 50 g of 1,3-butadiene were charged into a stirred 1.2-litre reactor. The reaction mixture obtained was heated to a temperature of 60° C. by means of a heating jacket. 0.691 g of a solution of di-iso-butyl-aluminium hydride (DIBAH) at 18% by weight in n-hexane (equal to 0.000875 moles), 0.452 g of a solution of diethyl-aluminium chloride (DEAC) at 10% by weight in n-hexane and finally 0.206 g of a solution of anhydrous neodymium versatate at 40% by weight in n-hexane, were then added. The polymerization did not take place due to the quantity of contaminants present in the solvent.

EXAMPLE 3

"Traditional" Purification of the Solvent Deriving from a "Demedium" Process Having the Composition Reported in Table 1

For this purpose, the solvent deriving from a "demedium" process having the composition reported in Table 1, was sent to a fractionated distillation column, obtaining the removal of the light compounds at the head and of the heavy compounds at the bottom. The column operated under the following conditions:
  temperature at head of column (removal of light contaminants, water): 78° C.;
  pressure at head of column: 0.077 MPaG;
  temperature at bottom of column (removal of heavy contaminants): 96° C.;
  30 theoretical steps, withdrawal of the purified solvent in gas phase.

The solvent thus purified was subjected to the analyses reported in Example 1: the results obtained are reported in Table 2.

TABLE 2

Composition of solvent deriving from a "demedium" process purified traditionally

| Composition | | |
|---|---|---|
| n-hexane | % | 84.50 |
| 2-methyl-pentane | % | 2.60 |
| 3-methyl-pentane | % | 7.70 |
| methyl-cyclopentane | % | 5.18 |
| cyclohexane | % | 0.02 |
| water | ppm | 1 |
| tetraethyl-silicate | ppm | 2 |
| amyl-triethoxy-silane | ppm | 2 |
| 2-chloro-propyl-triethoxy-silane | ppm | <2 |
| ethanol | ppm | 90 |

EXAMPLES 4-4a

Anionic Polymerization in the Presence of the Solvent of Example 3 or of a Solvent Normally Used in the Laboratory The solvent obtained as described in Example 3, having the composition reported in Table 2, was used in an anionic polymerization test at a laboratory level: said test was carried out operating as described in Example 1.

The polymerization took place and the almost complete conversion of 1,3-butadiene (>99.8%) was reached after 10 minutes, with a final reaction temperature of 67° C.

Table 4 reports the results obtained in terms of weight average molecular weight ($M_w$) and consequent active lithium-n-butyl (NBL) and non-active lithium-n-butyl (NBL) calculated from this. The weight average molecular weight ($M_w$) values were obtained by means of gel permeation chromatography (GPC) operating under the following conditions:

HPLC pump Agilent 1260;
Agilent 1260 autosampler;
Agilent solvent degasser online;
columns for SEC PL GEL $10^5$-$10^5$-$10^4$-$10^3$-$10^6$ A;
0.2 micron PTFE filters;
Agilent 1260 RI detector;
solvent/eluent: tetrahydrofuran (THF);
flow-rate: 1 ml/min;
temperature: 25° C.;
calculation of the molecular mass: Universal Calibration method.

The conversion was calculated by determining the quantity of 1,3-butadiene present in the mixture at the end of the reaction by means of headspace gas-chromatography using a HP5890 gas-chromatograph series 2 equipped with a Varian $Al_2O_3$+KCl column (50 m×0.32 mm×0.45 micron film) operating under the following conditions:

temperature: 50° C. for 5 min, 7° C./min up to 100° C., 100° C. for 4 min, 7° C./min up to 200° C., 200° C. for 16 min;
FID detector: 220° C.;
carrier: helium 20 psi;
injector: 180° C.;
injection volume: 50 μl/250 μl gas phase at room temperature 20-30° C.

For comparative purpose (Example 4a), a polymerization test was carried out operating under the same operational conditions, using n-hexane normally used in the laboratory, having the composition reported in Table 3 and representative of the quality of the solvent used in industrial synthesis processes.

TABLE 3

Composition of solvent normally used in the laboratory

| Composition | | |
|---|---|---|
| n-hexane | % | 84.50 |
| 2-methyl-pentane | % | 2.60 |
| 3-methyl-pentane | % | 7.70 |
| methyl-cyclopentane | % | 5.18 |
| cyclohexane | % | 0.02 |
| water | ppm | 1 |
| tetraethyl-silicate | ppm | 2 |
| amyl-triethoxy-silane | ppm | 2 |
| 2-chloro-propyl-triethoxy-silane | ppm | <2 |
| ethanol | ppm | <2 |

TABLE 4

Characteristics of the polymer obtained from anionic polymerization

| EXAMPLE | NBL charged (moles) | Mw (Dalton) | Active NBL (moles) | Non-active NBL (moles) |
|---|---|---|---|---|
| 4 | 0.00190 | 50200 | 0.00139 | 0.0051 |
| 4a | 0.00190 | 76200 | 0.00092 | 0.00098 |

The data reported in Table 4 show that the use of the solvent obtained in Example 3 (i.e. solvent deriving from a "demedium" process purified traditionally) (Example 4) involves an increase in the quantity of non-active lithium n-butyl (non-active NBL), associated with the presence of contaminants deriving from the "demedium" process not removed by the traditional purification process, with respect to the use of the solvent normally used in the laboratory, having the composition reported in Table 3 (Example 4a). The increase in the quantity of non-active lithium n-butyl (non-active NBL), leads, at an industrial level, to a worse control of the molecular weights of the polymers obtained, with repercussions on the relative applicative properties.

EXAMPLES 5-5a-5b-5c

Ziegler-Natta Polymerization in the Presence of the Solvent of Example 3 or of a Solvent Normally Used in the Laboratory The solvent obtained as described in Example 3 and reported in Table 2, was used in a Ziegler-Natta polymerization test at a laboratory level: said test was carried out operating as described in Example 2, with the only exception that different quantities of di-iso-butyl-aluminium hydride (DIBAH) were used (the quantities are reported in Table 5: Example 5, Example 5a and Example 5b).

The polymerization took place and the polymer obtained after 90 minutes, with a final reaction temperature ranging from 105° C. and 110° C., was subjected to the analyses reported hereunder.

Table 5 reports the results obtained in terms of weight average molecular weight ($M_w$), polydispersion index $M_w/M_n$ [i.e., a ratio between the weight average molecular weight ($M_w$) and the number average molecular weight ($M_n$)]. Table 5 also reports the conversion values (%) of 1,3-butadiene.

The weight average molecular weight ($M_w$) and the polydispersion index values $M_w/M_n$ were obtained by means of gel permeation chromatography (GPC) operating under the following conditions:

HPLC pump Agilent 1100;
Agilent 1100 autosampler;
Agilent solvent degasser online;
columns for SEC PL MIXED-A (4);
0.2 micron PTFE filters;
Agilent 1260 RI detector;
solvent/eluent: tetrahydrofuran (THF);
flow-rate: 1 ml/min;
temperature: 25° C.;
calculation of the molecular mass: Universal Calibration method.

The conversion was calculated by determining the quantity of 1,3-butadiene present in the mixture at the end of the reaction by means of headspace gas-chromatography as described in Example 4.

For comparative purpose (Example 5c), a polymerization test was carried out, operating under the same operational conditions, using n-hexane normally used in the laboratory, having the composition reported in Table 3 and representative of the quality of the solvent used in industrial synthesis processes.

TABLE 5

Characteristics of the polymer obtained from Ziegler-Natta polymerization

| EXAMPLE | DIBAH charged (moles) | $M_w$ (Dalton) | Polydispersion index ($M_w/M_n$) | Conversion (%) |
|---|---|---|---|---|
| 5c | 0.000875 | 374000 | 2.57 | 99.92 |
| 5 | 0.001100 | 640000 | 4.10 | 81.10 |
| 5a | 0.001325 | 532000 | 3.70 | 89.20 |
| 5b | 0.001775 | 385000 | 2.80 | 99.82 |

The data reported in Table 5 show that the use of the solvent obtained in Example 3 (i.e. solvent deriving from a "demedium" process purified traditionally) (Example 5, Example 5a and Example 5b) involves an increase in the quantity of di-iso-butyl-aluminium hydride (DIBAH) used, for obtaining weight average molecular weights ($M_w$), polydispersion indexes ($M_w/M_n$) and conversions comparable to those obtained with the solvent normally used in the laboratory having the composition reported in Table 3 (Example 5c). Said increase is associated with the presence of contaminants deriving from the "demedium" process not removed by the traditional purification process. The increase in the quantity of di-iso-butyl-aluminium hydride (DIBAH), leads, at an industrial level, to a worse control of the molecular weights, of the polydispersion index ($M_w/M_n$) and of the conversion, with repercussions on the relative applicative properties of the polymers obtained.

EXAMPLE 6 (INVENTION)

Purification of the Solvent Deriving from a "Demedium" Process According to the Present Invention For this purpose, the solvent deriving from a "demedium" process having the composition reported in Table 1, was subjected to the purification process object of the present invention, operating as follows:

sending the solvent to a liquid-liquid distillation column operating under the following conditions:
water/solvent ratio: 1:7 by weight;
pressure at head of column: 0.2 MPaG;
temperature: 40° C.;
sending the solvent leaving the head of said liquid-liquid distillation column to an azeotropic distillation column operating under the following conditions:
temperature at head of column (removal of light contaminants, water): 77° C.;
pressure at head of column: 0.075 MPaG;
temperature at bottom of column (removal of heavy contaminants): 95° C.;
30 theoretical steps;
sending the solvent withdrawn laterally (side withdrawal) from the azeotropic distillation column to a condenser and to a heat exchanger obtaining essentially water-free solvent;
sending the essentially water-free solvent to the adsorption section comprising beds of type 4A zeolites obtaining a polymer grade solvent.

Said solvent was subjected to the analyses reported in Example 1: the results obtained are reported in Table 6.

TABLE 6

Composition of solvent deriving from a "demedium" process purified according to the present invention

| Composition | | |
|---|---|---|
| n-hexane | % | 84.32 |
| 2-methyl-pentane | % | 2.62 |
| 3-methyl-pentane | % | 7.92 |
| methyl-cyclopentane | % | 5.14 |
| cyclohexane | % | 0.02 |
| water | ppm | <1 |
| tetraethyl-silicate | ppm | <2 |
| amyl-triethoxy-silane | ppm | <2 |
| 2-chloro-propyl-triethoxy-silane | ppm | <2 |
| ethanol | ppm | <2 |

EXAMPLES 7-7a

Anionic Polymerization in the Presence of the Solvent of Example 6 or of a Solvent Normally Used in the Laboratory The solvent obtained as described in Example 6, having the composition reported in Table 6, was used in an anionic polymerization test at a laboratory level: said test was carried out operating as described in Example 1.

The polymerization took place and the almost complete conversion of 1,3-butadiene (>99.8%) was reached after 5 minutes, with a final reaction temperature of 70° C.

Table 7 reports the results obtained in terms of weight average molecular weight ($M_w$) and consequent active lithium-n-butyl (NBL) and non-active lithium-n-butyl (NBL) calculated from this: said results were obtained as described in Example 4.

For comparative purpose (Example 7a), a polymerization test was carried out operating under the same operational conditions, using n-hexane normally used in the laboratory, having the composition reported in Table 3 and representative of the quality of the solvent used in industrial synthesis processes.

TABLE 7

Characteristics of the polymer obtained by anionic polymerization

| EXAMPLE | NBL charged (moles) | Mw (Dalton) | Active NBL (moles) | Non-active NBL (moles) |
|---|---|---|---|---|
| 7 | 0.00190 | 50500 | 0.00139 | 0.0051 |
| 7a | 0.00190 | 50200 | 0.00139 | 0.0051 |

The data reported in Table 7 show that the use of the solvent obtained in Example 6 (i.e. solvent deriving from a "demedium" process purified according to the present invention) (Example 7) does not involve an increase in the quantity of non-active lithium n-butyl (non-active NBL), with respect to the use of the solvent normally used in the laboratory having the composition reported in Table 3 (Example 7a) therefore indicating that the process object of the present invention, allows the contaminants to be eliminated from the solvent deriving from the "demedium" process.

EXAMPLES 8-8a

Ziegler-Natta Polymerization in the Presence of the Solvent of Example 6 or of a Solvent Normally Used in the Laboratory The solvent obtained as described in Example 6 and reported in Table 6, was used in a Ziegler-Natta polymerization test at a laboratory level: said test was carried out operating as described in Example 2, with the only exception that different quantities of di-iso-butyl-aluminium hydride (DIBAH) were used (the quantities are reported in Table 8: Example 8 and Example 8a).

The polymerization took place and the polymer obtained after 90 minutes, with a final reaction temperature of 115° C., was subjected to the analyses reported hereunder.

Table 8 reports the results obtained in terms of weight average molecular weight ($M_w$), polydispersion index $M_w/M_n$ [i.e., a ratio between the weight average molecular weight ($M_w$) and the number average molecular weight ($M_n$)] (said results were obtained operating as described in Example 5). Table 8 also reports the conversion values (%) of 1,3-butadiene (the conversions was determined operating as described in Example 4).

For comparative purpose (Example 8a), a polymerization test was carried out operating under the same operational conditions, using n-hexane normally used in the laboratory, having the composition reported in Table 3 and representative of the quality of the solvent used in industrial synthesis processes.

TABLE 8

Characteristics of the polymer obtained by Ziegler-Natta polymerization

| EXAMPLE | DIBAH charged (moles) | Mw (Dalton) | Polydispersity index | Conversion (%) |
|---|---|---|---|---|
| 8 | 0.000875 | 387000 | 2.61 | 99.73 |
| 8a | 0.000875 | 374000 | 2.57 | 99.92 |

The data reported in Table 8 show that the use of the solvent obtained in Example 6 (i.e. solvent deriving from a "demedium" process purified according to the present invention) having the composition reported in Table 6 (Example 8) does not involve an increase in the quantity of di-iso-butyl-aluminium hydride (DIBAH) used, for obtaining weight average molecular weights ($M_w$), polydispersion indexes ($M_w/M_n$) and conversions comparable to those obtained with the solvent normally used in the laboratory having the composition reported in Table 3 (Example 8a), therefore indicating that the process object of the present invention, allows the contaminants to be eliminated from the solvent deriving from the "demedium" process.

The invention claimed is:

1. A process for purification of a solvent deriving from production of an elastomeric blend, the process comprising:
   (a) optionally, subjecting the solvent to a pre-washing in the presence of an acid or basic aqueous solution;
   (b) feeding the solvent to a bottom of a liquid-liquid separation column and feeding water to a head of the liquid-liquid separation column;
   (c) feeding a stream leaving a head of the liquid-liquid separation column to an azeotropic distillation column; and
   (d) feeding a stream withdrawn laterally from the azeotropic distillation column to an adsorption section.

2. The process according to claim 1, wherein when the subjecting (a) is performed in the presence of an acid aqueous solution, the acid aqueous solution is an aqueous solution comprising at least one acid selected from the group consisting of sulfuric acid and a carboxylic acid, or
   when the subjecting is performed in the presence of a basic aqueous solution, the basic aqueous solution is an aqueous solution comprising at least one base selected from the group consisting of sodium hydroxide, sodium bicarbonate, potassium hydroxide and potassium bicarbonate.

3. The process according to claim 1, wherein in the feeding (b), the solvent is fed to the liquid-liquid separation column at a temperature ranging from 20° C. to 100° C.

4. The process according to claim 1, wherein in the feeding (b), the liquid-liquid separation column is maintained at a pressure ranging from 0.1 MPaG to 1.5 MPaG.

5. The process according to claim 1, wherein in the feeding (b), the solvent is fed to the liquid-liquid separation column, at a nominal flow-rate ranging from 100 kg/min to 15,000 kg/min.

6. The process according to claim 5, wherein in the feeding (b), the water is fed to the head of the liquid-liquid separation column, at a nominal flow-rate ranging from 5% to 100%, of the nominal flow-rate of the solvent.

7. The process according to claim 1, wherein in the feeding (b), the water is fed to the head of the liquid-liquid separation column at a temperature ranging from 20° C. to 100° C.

8. The process according to claim 1, wherein in the feeding (c), the stream leaving the head of the liquid-liquid separation column is fed to the azeotropic distillation column, at a temperature that is determined according to the solvent used in the feeding (b).

9. The process according to claim 1, wherein in the feeding (c), the azeotropic distillation column is maintained at a pressure ranging from 0.01 MPaG to 0.4 MPaG.

10. The process according to claim 1, wherein in the feeding (c), the stream leaving the head of the liquid-liquid separation column is fed to the azeotropic distillation column at a nominal flow-rate ranging from 100 kg/min to 20,000 kg/min.

11. The process according to claim 1, further comprising:
    feeding the stream leaving the head of the liquid-liquid separation column before being fed to the azeotropic distillation column in the feeding (c), to a first coalescer separator, thereby obtaining two streams:
a stream of a solvent essentially free of water-soluble contaminants, and
an aqueous stream comprising a solvent and contaminants, the contaminants being present in a concentration at most equal to a limit of their solubility in the solvent.

12. The process according to claim 11, further comprising:
feeding the stream of the solvent essentially free of water-soluble contaminants, before being fed to the azeotropic distillation column in the feeding (c), to a storage container.

13. The process according to claim 1, further comprising:
after the feeding (b), sending a stream leaving the bottom of the liquid-liquid separation column to a second coalescer separator, thereby obtaining two streams:
an aqueous stream comprising a solvent in a quantity ranging from 15 ppm to 500 ppm, and contaminants dissolved in the solvent at the temperature of the aqueous stream, the temperature ranging from 20° C. to 100° C., and
an organic stream comprising a solvent optionally deriving from a coalescence of the solvent.

14. The process according to claim 1, wherein in the feeding (d), the stream withdrawn laterally is sent to a condenser and subsequently to a heat exchanger.

15. The process according to claim 1, wherein the adsorption section comprises an adsorption bed comprising at least one selected the group consisting of a zeolite and an activated alumina.

16. The process according to claim 1, further comprising:
after the feeding (c), sending a gaseous stream leaving the head of the azeotropic distillation column, comprising a solvent, light contaminants and water vapour, to a first partial condenser, thereby obtaining two streams:
a liquid stream which is sent to a gravity separator, and
a first stream in a vapour phase that is sent to a second partial condenser, thereby obtaining two streams:
a second stream in a vapour phase, comprising light contaminants, that is subsequently sent to an incineration system, and
a biphasic liquid stream, comprising a water phase and a solvent phase, that is sent to a small-capacity tank used for allowing correct functioning of the process.

17. The process according to claim 1, further comprising:
partly sending a first stream leaving a bottom of the azeotropic distillation column to a first reboiler to be vaporized and recycled to the azeotropic distillation column, and
partly sending a second stream leaving the bottom of the azeotropic distillation column, in order to partially recover the solvent, to a second reboiler, equipped with a small distillation column with plates or filling elements to be partially vaporized and recycled to the azeotropic distillation column.

* * * * *